United States Patent Office 2,925,420
Patented Feb. 16, 1960

2,925,420

PIPERAZINE DERIVATIVES

Raymond J. Michaels, Jr., Mundelein, and Harold E. Zaugg, Lake Forest, Ill., assignors to Abbott Laboratories, North Chicago, Ill., a corporation of Illinois No Drawing. Application September 25, 1957
Serial No. 686,015

4 Claims. (Cl. 260—268)

This invention relates to a new series of carbinol amines, in particular, amines comprising substituted N-heterocyclic rings and to novel methods of preparing same. The compounds of this invention are represented by the following structural formula:

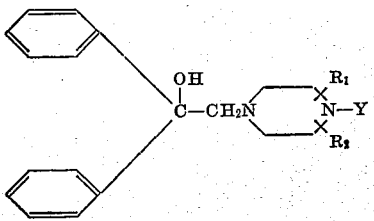

where $R_1$ and $R_2$ are hydrogen or loweralkyl and Y is pyridine, hydrogen, loweralkyl hydroxy and loweralkyl.

Examples of compounds substituted at the N position are N-2-pyridylpiperazine, N-β-hydroxyethyl-piperazine and the like. Monosubstituted piperazines at a carbon position are represented by 2-methylpiperazine and the like, and loweralkyl piperazines disubstituted at various carbon positions are represented, for example, by 2,5-dimethyl-piperazine and the like.

The compounds are prepared by reacting 1,1-diphenylethylene oxide with the secondary amino group comprising a portion of the selected N-heterocyclic ring. In this manner, the said amino group participates in the reaction with 1,1-diphenylethylene oxide to give the substituted N-heterocyclic derivatives of β-substituted derivatives of α,α-diphenylethanol.

Salts of the foregoing compounds are prepared and are intended to comprise a part of this invention. By the term "salts," it is intended that they include acid additions salts of said compounds as well as the quaternary ammonium salts formed at the tertiary nitrogen.

The compounds of this invention have been found to show anti-spasmodic activity and anti-parkinson activity.

The following examples are intended to serve as an illustration of the workings of this invention and are not intended to limit the products and steps to the exact ingredients and proportions stated therein.

EXAMPLE I

N-(β,β-diphenyl-β-hydroxethyl)-N'-2-pyridylpiperazine 1,1-diphenylethylene oxide (2.0 gms., .01 mole) is combined with N-(2-pyridyl)-piperazine (3.3 gms., .02 mole) and the resulting mixture is heated for 16 hours on the steam bath. About 50 cc. of water is added to the cooled reaction mixture to precipitate the crude oily product. The product is extracted with ether and the extract is dried over anhydrous sodium sulfate. The drying agent is removed by filtration and the ether is evaporated to isolate the product, N-(β,β-diphenyl-β-hydroxyethyl)-N'-2-pyridylpiperazine. The product is taken up in 30 cc. of isopropyl alcohol and excess isopropyl alcoholic hydrogen chloride, from which the dihydrochloride salt of N-(β,β-diphenyl-β-hydroxyethyl)-N'-2-pyridylpiperazine is precipitated in a yield of 1.9 gms. (53%), M.P. 123–4° C.

Analysis.—Calcd. for $C_{23}H_{25}N_3O$: C, 76.85%; H, 7.01%; N, 11.69%; O, 4.45%. Found: C, 76.59%; H, 7.11%; N, 11.72%; O, 4.23%.

EXAMPLE II

N-(β,β-diphenyl-β-hydroxyethyl)-N'-β-hydroxylethyl-piperazine 1,1-diphenylethylene oxide (2.9 gms., .015 mole) is combined with N-β-hydroxyethylpiperazine (3.9 gms., .03 mole) and the reaction is conducted according to the procedure of Example I.

The M.P. of the dihydrochloride salt of the above named amine is 219–20° C. and it is collected in a yield of 4.6 gms.

Analysis.—Calcd. for $C_{20}H_{26}N_2O_2 \cdot 2HCl$: C, 60.15%; H, 7.07%; N, 7.02%. Found: C, 60.15%; H, 7.26%; N, 6.83%.

EXAMPLE III 1-methyl-4-(β,β-diphenyl-β-hydroxyethylaminoethyl) piperazine 1,1-diphenylethylene oxide (2.9 gms., .015 mole) is combined with 1-methyl-4-(β-aminoethyl)-piperazine (2.9 gms., .03 mole) and the reaction is conducted according to the procedure of Example I.

The M.P. of the trihydrochloride salt of the above named amine is 247–8° C. and it is collected in a yield of 2.2 gms.

Analysis.—Calcd. for $C_{21}H_{29}N_3O \cdot 3HCl$: C, 56.19%; H, 7.19%; N, 9.36%. Found: C, 56.26%; H, 7.17%; N, 9.28%.

EXAMPLE IV 2,5-dimethyl-4-(β,β-diphenyl-β-hydroxyethyl) piperazine 1,1-diphenylethylene oxide (2.9 gms., .015 mole) is added portionwise to 2,5-dimethylpiperazine (14 gms., .07 mole) and the reaction is conducted according to the procedure of Example I.

The M.P. of the dihydrochloride salt of the above named amine is 335–6° C. and it is collected in a yield of 7.9 gms.

Analysis.—Calcd. for $C_{20}H_{26}N_2O \cdot 2HCl \cdot \frac{1}{2}H_2O$: C, 61.22%; N, 7.45%; H, 7.14%. Found: C, 61.07%; H, 7.42%; N, 7.35%.

EXAMPLE V 2,6-dimethyl-4-(β,β-diphenyl-β-hydroxyethyl) piperazine 1,1-diphenylethylene oxide (2.9 gms., .015 mole) is added portionwise to 2,6-dimethylpiperazine (14 gms., .07 mole) and the reaction is conducted according to the procedure of Example I.

The M.P. of the base is 72–3° C. and it is collected in the yield of 9.0 gms. (41%).

Analysis.—Calcd. for $C_{20}H_{26}N_2O$: C, 77.38%; H, 8.44%; N, 7.02%. Found: C, 77.53%; H, 8.47%; N, 9.07%.

EXAMPLE VI 2-methyl-4-(β,β-diphenyl-β-hydroxyethyl) piperazine 1,1-diphenylethylene oxide (14 gms., .07 mole) is added portionwise to 2-methylpiperazine (21 gms., .21 mole) and the reaction is conducted according to the procedure of Example I.

The collected base is treated with alcoholic hydrogen chloride to form the dihydrochloride salt of 2-methyl-4-(β,β-diphenyl-β-hydroxyethyl) piperazine and it is collected in a yield of 13.3 gms. (51%), M.P. 223–5° C.

Analysis.—Calcd. for $C_{19}H_{24}N_2O \cdot 2HCl$: C, 61.78%; H, 7.10%; N, 7.59%. Found: C, 61.67%; H, 7.21%; N, 7.70%.

EXAMPLE VII

*1,2-dimethyl-4-(β,β-diphenyl-β-hydroxyethyl) piperazine*

The base of Example VI, 2-methyl-4-(β,β-diphenyl-β-hydroxyethyl) piperazine, is treated with 1.2 gms. (.02 mole) of a formic acid solution (90%) and 1.4 gms. of a formaldehyde solution (35%). This methylation step results in the production of the base, 1,2-dimethyl-4-(β,β-diphenyl-β-hydroxyethyl) piperazine. Subsequent treatment with alcoholic hydrogen chloride results in the dihydrochloride salt of said base in a yield of 3.9 gms. (72%), M.P. 170–172° C.

*Analysis.*—Calcd. for $C_{20}H_{26}N_2O \cdot 2HCl$: C, 62.66%; H, 7.36%; N, 7.31%. Found: C, 62.55%; H, 7.38%; N, 7.33%.

Others may practice the invention in any of the numerous ways which will be suggested by this disclosure to one skilled in the art. All such practice of the invention is considered to be a part hereof provided it falls within the scope of the appended claims.

We claim:

1. N - (β,β - diphenyl - β - hydroxyethyl) - N' - 2-pyridylpiperazine.
2. N - (β,β - diphenyl - β - hydroxyethyl) - N' - β-hydroxylethylpiperazine.
3. N - (β,β - diphenyl - β - hydroxyethyl) - N' - 2-pyridylpiperazine dihydrochloride.
4. N - (β,β - diphenyl - β - hydroxyethyl) - N' - β-hydroxyethylpiperazine dihydrochloride.

References Cited in the file of this patent

UNITED STATES PATENTS

| | | |
|---|---|---|
| 2,633,467 | De Benneville | Mar. 31, 1953 |
| 2,706,194 | Morris et al. | Apr. 12, 1955 |

FOREIGN PATENTS

| | | |
|---|---|---|
| 683,950 | Great Britain | Dec. 10, 1952 |

OTHER REFERENCES

Beck et al.: Jour. Amer. Chem. Soc., vol. 74, pp. 605–608 (1952).

Chemical Abstracts, vol. 25, p. 5170 (1931).